(12) United States Patent
Mysore et al.

(10) Patent No.: US 8,917,991 B2
(45) Date of Patent: Dec. 23, 2014

(54) FTTH RF OVER GLASS (RFOG) ARCHITECTURE AND CPE WITH WAVELENGTH SEPARATOR

(75) Inventors: Sudhesh Mysore, Carlsbad, CA (US); Charles Barker, Sunnyvale, CA (US); Oleh Sniezko, Highlands Ranch, CO (US); Krzysztof Pradzynski, Santa Clara, CA (US)

(73) Assignee: Aurora Networks, Inc., Santa Clara, CA (US)

( * ) Notice: Subject to any disclaimer, the term of this patent is extended or adjusted under 35 U.S.C. 154(b) by 468 days.

(21) Appl. No.: 12/587,893

(22) Filed: Oct. 13, 2009

(65) Prior Publication Data

US 2010/0150557 A1 Jun. 17, 2010

Related U.S. Application Data

(60) Provisional application No. 61/195,807, filed on Oct. 10, 2008.

(51) Int. Cl.

| | |
|---|---|
| *H04J 14/00* | (2006.01) |
| *H04B 10/00* | (2013.01) |
| *H04J 14/02* | (2006.01) |
| *H04N 7/22* | (2006.01) |
| H04H 60/97 | (2008.01) |
| H04Q 11/00 | (2006.01) |

(52) U.S. Cl.
CPC ......... *H04J 14/0282* (2013.01); *H04J 14/0226* (2013.01); *H04J 14/0298* (2013.01); *H04N 7/22* (2013.01); *H04J 14/0232* (2013.01); *H04J 14/0247* (2013.01); *H04J 14/0252* (2013.01); H04H 60/97 (2013.01); H04Q 11/0067 (2013.01)

USPC ............... 398/68; 398/67; 398/69; 398/72; 398/79; 398/115; 398/116; 398/153

(58) Field of Classification Search
CPC .............. H04J 14/02; H04J 14/0226–14/0254; H04J 14/0298; H04J 14/08–14/086
USPC .................. 398/43, 58–79, 89, 115–117, 153
See application file for complete search history.

(56) References Cited

U.S. PATENT DOCUMENTS

| | | | | |
|---|---|---|---|---|
| 5,311,344 | A * | 5/1994 | Bohn et al. ...................... | 398/72 |
| 6,577,414 | B1 * | 6/2003 | Feldman et al. ................. | 398/43 |
| 6,978,091 | B1 * | 12/2005 | Needle ............................. | 398/72 |
| 2003/0128983 | A1 | 7/2003 | BuAbbud et al. | |
| 2005/0053376 | A1 * | 3/2005 | Joo et al. ......................... | 398/72 |

(Continued)

FOREIGN PATENT DOCUMENTS

| | | | | |
|---|---|---|---|---|
| WO | WO 00/22822 | | 4/2000 | |
| WO | WO0022822 | * | 4/2000 | ............... H04N 7/10 |

*Primary Examiner* — Li Liu
(74) *Attorney, Agent, or Firm* — John Bruckner PC

(57) ABSTRACT

In fiber-to-the-home (FTTH) RF over Glass (RFoG) Architecture a customer-premise-equipment (CPE) includes a wavelength separator. A method includes up-converting a baseband upstream data signal to a frequency band above a frequency band of a baseband downstream data signal; combining the up-converted upstream data signal with an upstream cable return signal; transmitting the up-converted upstream data signal and the upstream cable return signal using a single upstream laser; and separating, with a wavelength separator, A) a downstream data signal and a downstream cable feed signal from B) the combined up-converted upstream data signal and upstream cable return signal.

4 Claims, 5 Drawing Sheets

(56) References Cited

U.S. PATENT DOCUMENTS

| | | | |
|---|---|---|---|
| 2005/0063424 A1* | 3/2005 | Weinstein et al. | 370/535 |
| 2005/0155082 A1* | 7/2005 | Weinstein et al. | 725/131 |
| 2005/0175035 A1* | 8/2005 | Neely et al. | 370/486 |
| 2006/0189354 A1* | 8/2006 | Lee et al. | 455/561 |
| 2007/0274730 A1* | 11/2007 | Koo et al. | 398/163 |
| 2008/0063397 A1* | 3/2008 | Hu et al. | 398/43 |

* cited by examiner

FTTH RF OVER GLASS (RFOG) ARCHITECTURE AND CPE WITH WAVELENGTH SEPARATOR

CROSS-REFERENCE TO RELATED APPLICATION

This application claims a benefit of priority under 35 U.S.C. 119(e) from copending provisional patent application U.S. Ser. No. 61/195,807, filed Oct. 10, 2008, the entire contents of which are hereby expressly incorporated herein by reference for all purposes.

BACKGROUND INFORMATION

1. Field of the Invention

Embodiments of the invention relate generally to the field of networking. More particularly, an embodiment of the invention relates to methods of and apparatus for fiber-to-the-home (FTTH) RF over Glass (RFoG) Architecture and customer-premise-equipment (CPE).

2. Discussion of the Related Art

Telephone companies such as Verizon and AT&T have started to offer services over fiber-to-the-premise (FTTP) and fiber-to-the-curb (FTTC) systems such as FiOS™ and U-Verse™. These systems offer dramatically higher data bandwidths by bringing optical fiber to the home or close to home. In order to maintain their upper hand in bandwidth per customer, North American cable operators started deploying scalable fiber-to-the-home (FTTH) systems, building upon fiber deployed to date in new builds and upgrades that can offer similar to, or higher than, bandwidths provided by FiOS™ and U-Verse™.

MSOs want to continue utilizing DOCSIS platform for wideband services such as high speed data, Voice over IP (VoIP) and other services supported by this platform, which provides for downstream data bandwidth up to 640 Mb/s or more, until such a time as yet higher data speeds are required. At such a time, the MSOs want the flexibility to upgrade their FTTH CPE device to handle Gb/s data speeds offered by passive optical networks (PONs) such as GPON or GEPON. They also want to support deployed interactive TV services that are based on set top boxes with active upstream signaling to support fully interactive services such as Video on Demand (VoD) and Switched Digital Video (SDV).

RF over Glass (RFoG) is the name given to the generic FTTH architecture that supports both legacy DOCSIS cable upstream signals and an optional future expansion to additional high speed (>1 Gb/s) PON service. However, deploying cost-effective RFoG system makes future expansion of this system with GPON or GEPON more difficult. The RFoG transmitters used to transmit upstream DOCSIS signals and set top box upstream signaling information for interactive TV, and placed in the CPE utilize a low-cost 1310 nm laser, which is the same wavelength as that used by upstream PON signals. The solution has been to use a different wavelength, usually 1590 nm, to transport the cable upstream signal and 1310 nm to transport the upstream PON signal. For systems that initially deployed 1310 nm upstream lasers, the expansion would result in replacing and obsolescing these deployed lasers with much higher cost CPE devices.

FIG. 1 shows the schematic diagram of the customer-premise-equipment (CPE) device typically used by cable operators to provide both traditional cable service and PON service on an RFoG system expanded to support PON architecture and services. The CPE uses one optical filter to extract the traditional cable services (1550 nm downstream/1590 nm upstream) and a second optical filter to extract the PON service (1490 nm downstream/1310 nm upstream).

The CPE device typically uses a relatively low-cost digital-quality 1310 nm laser for transmitting the upstream baseband PON signal from the optical network unit (ONU) but a significantly more expensive 1590 nm laser (or other CWDM wavelength such as 1610 nm) for transmitting the traditional cable return signals. The optical receivers for the downstream signals (1550 nm for the cable downstream and 1490 nm for the PON downstream) are relatively low-cost in comparison to the upstream lasers.

A disadvantage of this conventional RFoG architecture is the disproportionate cost of transporting the traditional cable return signals—mainly signaling from a set-top-box (STB) and QAM channels for DOCSIS data signals. This is due to the fact that the 1310 nm is the standardized wavelength used to carry the upstream PON data. Therefore, another wavelength such as 1590 nm (or a nearby CWDM wavelength such as 1610 nm) is typically used. However, such lasers are currently significantly higher in price than 1310 nm lasers due to much more stringent requirements on standard CWDM lasers in comparison to generic 1310 nm lasers. Low cost generic lasers with wavelengths that would not collide with the remaining three wavelengths are not currently available.

The cable return signals lie in a narrow frequency band (for example 5-42 MHz in North America and 5-65 MHz in Europe, generally F9-F8) and have a typical maximum upstream data capacity of 120 Mb/s to 240 Mb/s, about five to ten times less than the capacity of a PON service. However, the cost of the 1590 laser used to transport the cable return signals is almost twice that of the 1310 nm laser used to transport the upstream PON signal. Thus the cost per unit bandwidth for transporting the cable upstream signals is about ten to twenty times higher than for the upstream PON signal.

This seems too much of a premium to pay for a relatively low-bandwidth signal. However, cable operators have expressed a strong preference for keeping their existing STB and DOCSIS infrastructure and for adding future high-speed Ethernet data service using overlay architecture such as RFoG.

SUMMARY OF THE INVENTION

There is a need for the following embodiments of the invention. Of course, the invention is not limited to these embodiments.

According to an embodiment of the invention, a process comprises: up-converting a baseband upstream data signal to a frequency band above a frequency band of a baseband downstream data signal; combining the up-converted upstream data signal with an upstream cable return; transmitting the up-converted upstream data signal and the upstream cable return using a single upstream laser; separating the frequency up-converted data signal from the upstream cable return using an RF diplexer; and down-converting the frequency up-converted upstream data signal back to baseband.

According to another embodiment of the invention, an apparatus comprises: a frequency up-converter that up-converts a baseband upstream data signal to a frequency band above a frequency band of a baseband downstream data signal; a frequency combiner coupled to the frequency up-converter that combines the up-converted upstream data signal with an upstream cable return; a single upstream laser coupled to the frequency combiner that transmits the up-converted upstream data signal and the upstream cable return; an RF diplexer coupled to the single upstream laser that separats the frequency up-converted data signal from the upstream cable return; and a frequency down-converter that down-converts the frequency up-converted upstream data signal back to baseband.

These, and other, embodiments of the invention will be better appreciated and understood when considered in conjunction with the following description and the accompanying drawings. It should be understood, however, that the following description, while indicating various embodiments of the invention and numerous specific details thereof, is given for the purpose of illustration and does not imply limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer concept of embodiments of the invention, and of components combinable with embodiments of the invention, and operation of systems provided with embodiments of the invention, will be readily apparent by referring to the exemplary, and therefore nonlimiting, embodiments illustrated in the drawings (wherein identical reference numerals (if they occur in more than one view) designate the same elements). Embodiments of the invention may be better understood by reference to one or more of these drawings in combination with the following description presented herein. It should be noted that the features illustrated in the drawings are not necessarily drawn to scale.

Figure 1:
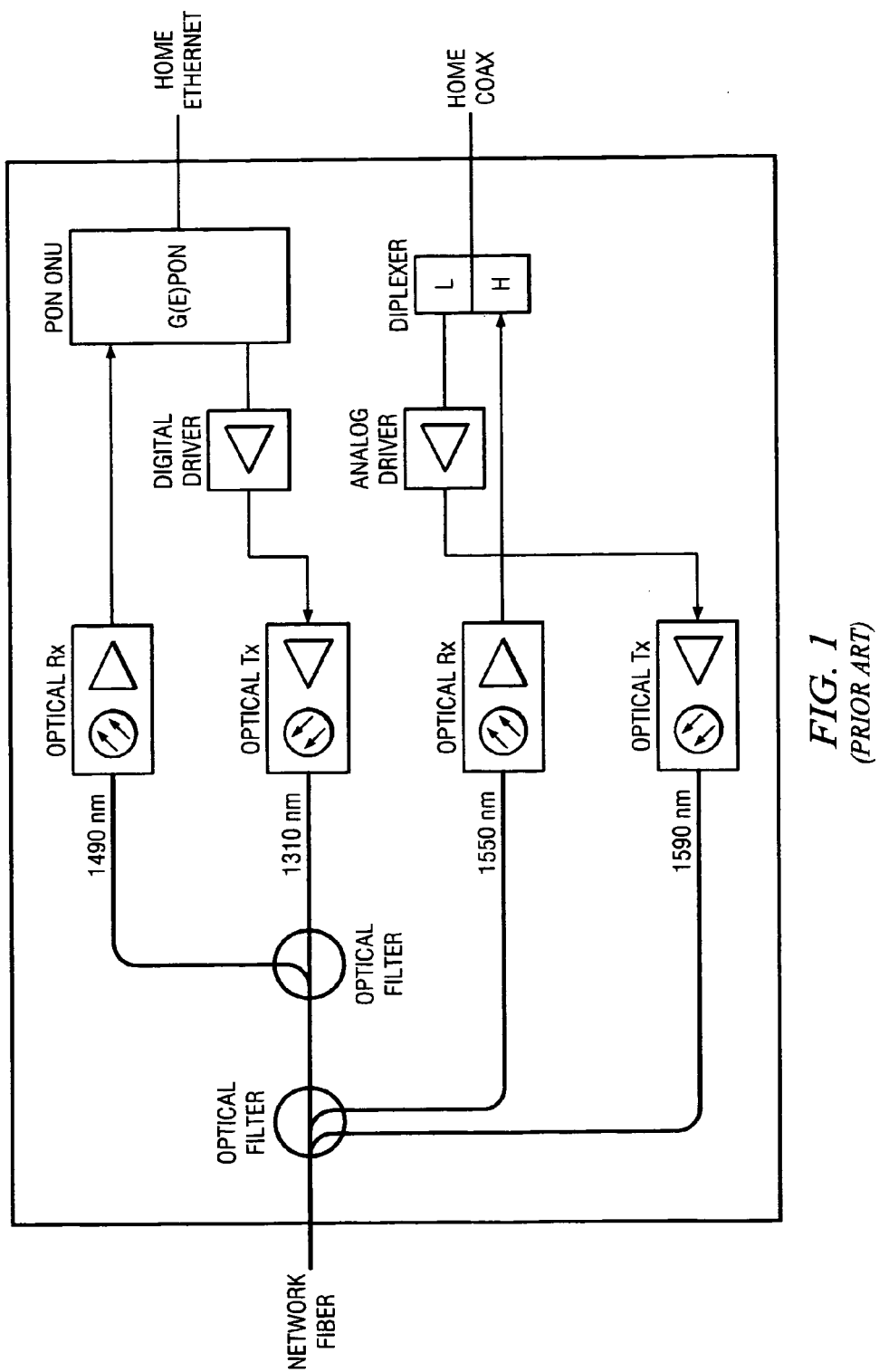
FIG. 1 depicts a schematic diagram of a conventional RFoG CPE device that provides both traditional cable services (using 1550 nm down/1590 nm up wavelengths) and PON service (using 1490 nm down/1310 nm up wavelengths) utilizing two upstream lasers, appropriately labeled "PRIOR ART."

DESCRIPTION OF PREFERRED
EMBODIMENTS

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In general, embodiments of the invention relate to FTTH architectures that make use of advanced modulation and demodulation techniques (known collectively as "HI PHY") along with frequency-division-multiplexing (FDM) to provide both high-speed Ethernet service and traditional cable return over a single return laser. The elimination of the expensive 1590 nm or other wavelength laser and related to this wavelength filter used in traditional RFoG architectures greatly reduces the cost of the CPE device. Architectures that allow for the use of a single optical receiver in the CPE device to detect both the downstream high speed data and traditional cable forward signals are also presented, resulting in further cost savings due to lower number of receivers and simplified optical filtering of two or three wavelengths in comparison to four closely spaced wavelengths.

An embodiment of the invention can include novel RFoG architecture where high-speed Ethernet service overlay is achieved using HI PHY modems in the FTTH Hub and CPE devices. Downstream high speed data is baseband but upstream is frequency up-converted to a frequency band above F7 (F7>F8>F9) so that it can be combined with traditional cable return occupying bandwidth F9-F8 and transported to the Hub using a single upstream laser. The up-converted high speed data signal is separated from the cable return using a RF diplexer in the Hub and down-converted back to baseband and fed to the HI PHY modem. The elimination of one return laser and the use of a less complicated wavelength separator in the CPE unit results in lower CPE cost. Lower cost wavelength separators are also used in the FTTH Hub and fewer receivers are used there.

An embodiment of the invention can include even lower CPE cost achieved by frequency up-converting the downstream high speed data signal also, to a band above F5 (into F4-F3 frequency bandwidth where F3>F4>F5). At the CPE device, a less complex wavelength separator is used to separate the single upstream wavelength from a single downstream wavelength. Both downstream signals (cable forward below F5 and up-converted high speed data signal above F4) are detected using a single optical receiver and separated using an RF diplexer. The up-converted high speed data signal is then down-converted back to baseband and fed to the HI PHY modem in the CPE device. The elimination of one optical receiver and the use of a very simple dual-wavelength separator in the CPE results in a lower-cost CPE unit.

An embodiment of the invention can include even further cost-savings realized by eliminating the Hub up-converter and the CPE down-converter for the special case where the HI PHY modulated high speed data signal has an upper frequency limit F1 lower than F6. Since the baseband HI PHY signal lies in a frequency band completely below that of the forward cable signal (F6-F5) only one optical receiver can still detect both downstream signals in the CPE device. A diplexer again separates the two downstream signals, but a down-converter is no longer needed in the CPE unit for the baseband HI PHY signal. The baseband HI PHY signal goes directly to the HI PHY modem in the CPE unit. The upstream high speed data signal is still up-converted as in the previous architectures, but elimination of the Hub up-converter and the CPE down-converter results in a further reduction in the cost-per-subscriber of this architecture An embodiment of the invention can include a PON version of this architecture utilizing GPON/GEPON chip sets in the Hub and CPE. Digital baseband signal from the PON chip modulates a digital laser in the Hub. The upstream baseband signal from the G(E)PON chip in the CPE device is modulated using a HI PHY modem and frequency up-converted to a frequency band above F8. This allows it to be combined with the traditional cable return occupying bandwidth F9-F8 and this combined signal modulates the return laser. At the Hub, a RF diplexer is used to separate the two upstream signals. The up-converted high speed data signal is frequency down-converted back to baseband, demodulated by a HI PHY modem and fed to the Hub PON chip. The elimination of one return laser and the use of a less expensive wavelength separator in the CPE device lower the cost per subscriber of this architecture compared to a traditional RFoG architecture with high speed data option. This architecture also uses low cost and high capacity PON chips and circuitry where forward signal is not processed and delivered in its original baseband form to a low cost receiver that is used as standard receivers in high volume for PON applications.

An embodiment of the invention can include variation of the architecture explained in the paragraph above in which other types of baseband data link chip sets is used rather than GPON/GEPON chip sets.

EXAMPLES

Specific embodiments of the invention will now be further described by the following, nonlimiting examples which will serve to illustrate in some detail various features. The following examples are included to facilitate an understanding of ways in which an embodiment of the invention may be practiced. It should be appreciated that the examples which follow represent embodiments discovered to function well in the practice of the invention, and thus can be considered to constitute preferred mode(s) for the practice of the embodiments of the invention. However, it should be appreciated that many changes can be made in the exemplary embodiments which are disclosed while still obtaining like or similar result without departing from the spirit and scope of an embodiment of the invention. Accordingly, the examples should not be construed as limiting the scope of the invention.

Frequency-Division-Multiplexing of Upstream Signals

Figure 2:
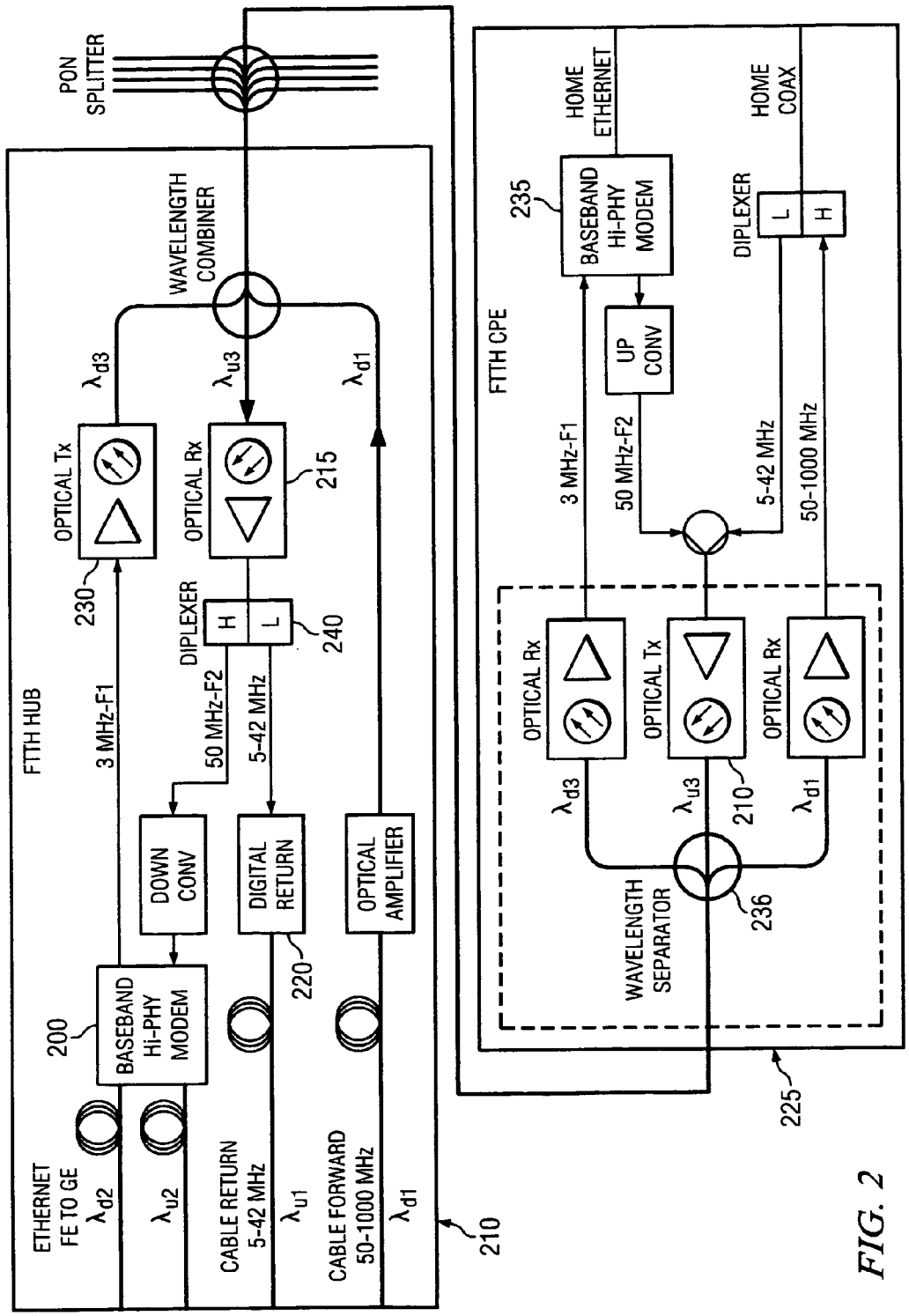
FIG. 2 depicts a novel RFoG architecture where a HI PHY modem is used for high speed data overlay and the upstream high speed data signal is up-converted so that a single laser (wavelength $\lambda_{u3}$) is used for both the cable return and high speed data signals.

FIG. 2 shows the schematic diagram of an FTTH architecture where a HI PHY modem 200 is utilized for high-speed Ethernet overlay and a single return laser 205 (with wavelength $\lambda_{u3}$, 1310 nm for example) in the CPE device transports both the traditional cable return as well as the high-speed Ethernet signal.

As in a conventional RFoG architecture, the downstream signal (with wavelength $\lambda_{d1}$, typically 1550 nm) transports the cable forward signals. It is optically amplified in the FTTH Hub 210 (in this example, other amplification examples are possible, including but not limited to amplification in headend or central office) and split to all the FTTH CPEs 225. The cable return signals from all the CPEs are optically combined and detected with a single optical receiver at the FTTH Hub 210. The output of this receiver 215 then drives a digital return transmitter 220 that converts the return signal into a digital signal that is transported back to the headend (HE) from the Hub (over wavelength $\lambda_{u1}$). Alternatively, a conventional analog "cable-return" laser can be used for this purpose or the CPE signal can be received in the headend without an additional link.

A HI PHY modem 200 is used to transport the high speed data service. The modem can use one of the many advanced modulation/demodulation techniques available, such as QPSK, Quadrature Amplitude Modulation (QAM), CDMA, SCDMA, Orthogonal Frequency Division Multiplexing (OFDM) and Scalable OFDM Access (SOFDMA), as implemented in standards such as DOCSIS (CDMA, SCDMA, QAM, QPSK), BPL (OFDM), MoCA (OFDM), WiMax (SOFDMA) and HPNA (OFDM). A determining characteristic of these advanced modulation techniques, and a parameter for guidance toward preferred embodiments without undue experimentation, is the high spectral efficiency they achieve, as quantified by the bits/s per Hz parameter. Spectral efficiencies up to 7 b/s per Hz or more are possible, meaning that a 1.25 Gb/s GEPON signal can be packed into less than 200 MHz of analog bandwidth.

In FIG. 2, the HI PHY modem 200 in the FTTH hub 210 takes a high speed data signal (any data rate, such as from less than 100 Mb/s (FE) to more than 1000 Mb/s (GE) and converts it into a baseband signal occupying an analog bandwidth from 3 MHz (for example, more generally F0) up to F1 (not necessarily in the examples in this document, HI PHY modem 200 has symmetrical downstream and upstream bandwidth of F0-F1; generally this does not have to be the case and but it is mentioned here as an example), where the upper frequency limit F1 depends on the high speed data speed and could be in the range of ~200 MHz for a GE Ethernet signal. This baseband signal modulates a laser 230 (wavelength $\lambda_{d3}$, 1490 nm for example), is distributed to all the CPEs, and is demodulated by another HI PHY modem 235 in the CPE device.

The upstream high speed data signal can also be modulated into a baseband signal. However, this signal is not preferably modulated by a separate laser for upstream transport. It is instead frequency up-converted into the frequency band 50 MHz (more generally F7 depending on and higher than the upper frequency of the traditional cable return F8)-F2, where the upper frequency limit F2 again depends on the high speed data speed. Since this frequency band lies above the traditional cable return, the up-converted high speed data signal is combined with the cable return (using a simple RF combiner) and this combined signal modulates an upstream laser (wavelength $\lambda_{u3}$, 1310 nm for example). This can be a relatively low-cost "cable return" laser since the upper frequency of the combined upstream bandwidth can F2 can be relatively low (for example 300 MHz or lower) and includes quasi-analog signals such as QAM and OFDM with much less stringent linearity requirements than analog signals. For European operation, the frequency band of the up-converted signal would start at some higher frequency instead of 50 MHz due to the 65 MHz cable return bandwidth. In general terms, the crossover between the traditional cable return and high speed data return depends on how much upstream bandwidth is allocated to cable and how much of the upstream bandwidth is allocated to high speed data. The upper frequency limit F2 of the upstream signal depends on the sum of both and a crossover guard-band.

At the FTTH CPE 225, a wavelength separator 236 is used to separate the single upstream wavelength from the two downstream wavelengths. This wavelength separator has to separate three widely spaced wavelengths, rather than four as in a conventional RFoG architecture (FIG. 1), and is consequently less expensive.

At the FTTH Hub 210 (or other location), the upstream signal is optically detected and an RF diplexer filter 240 is used to separate the cable return signal from the upstream up-converted high speed data signal. The cable return signal can be digitized, as previously described, or continue to the HE (headend) as an analog signal. The wavelength of this upstream signal is labeled $\lambda_{u1}$ in FIG. 2 (1310 nm for example). The up-converted high speed data signal is frequency down-converted back to a baseband signal and demodulated by a HI PHY modem 200 in the FTTH Hub. The upstream and downstream high speed data signals are transported, using a pair of wavelengths ($\lambda_{u2}$, $\lambda_{d2}$ respectively), back to the cable headend (HE) or central office (CO).

In this particular example, there are a total of four wavelengths between the cable HE and the FTTH Hub—two for the cable forward and return ($\lambda_{d1}$, $\lambda_{u1}$ respectively) and two wavelengths for the high speed data upstream and downstream ($\lambda_{u2}$, $\lambda_{d2}$ respectively). If desired, an optical multiplexer can be used in the Hub and in the Headend to multiplex all four wavelengths on a single fiber from the Hub to the HE. By using the appropriate type of wavelength combiner, any number of fibers, from one to four, may be used for the HE-to-Hub link.

Frequency-Division-Multiplexing of Upstream and Downstream Signals

Figure 3:
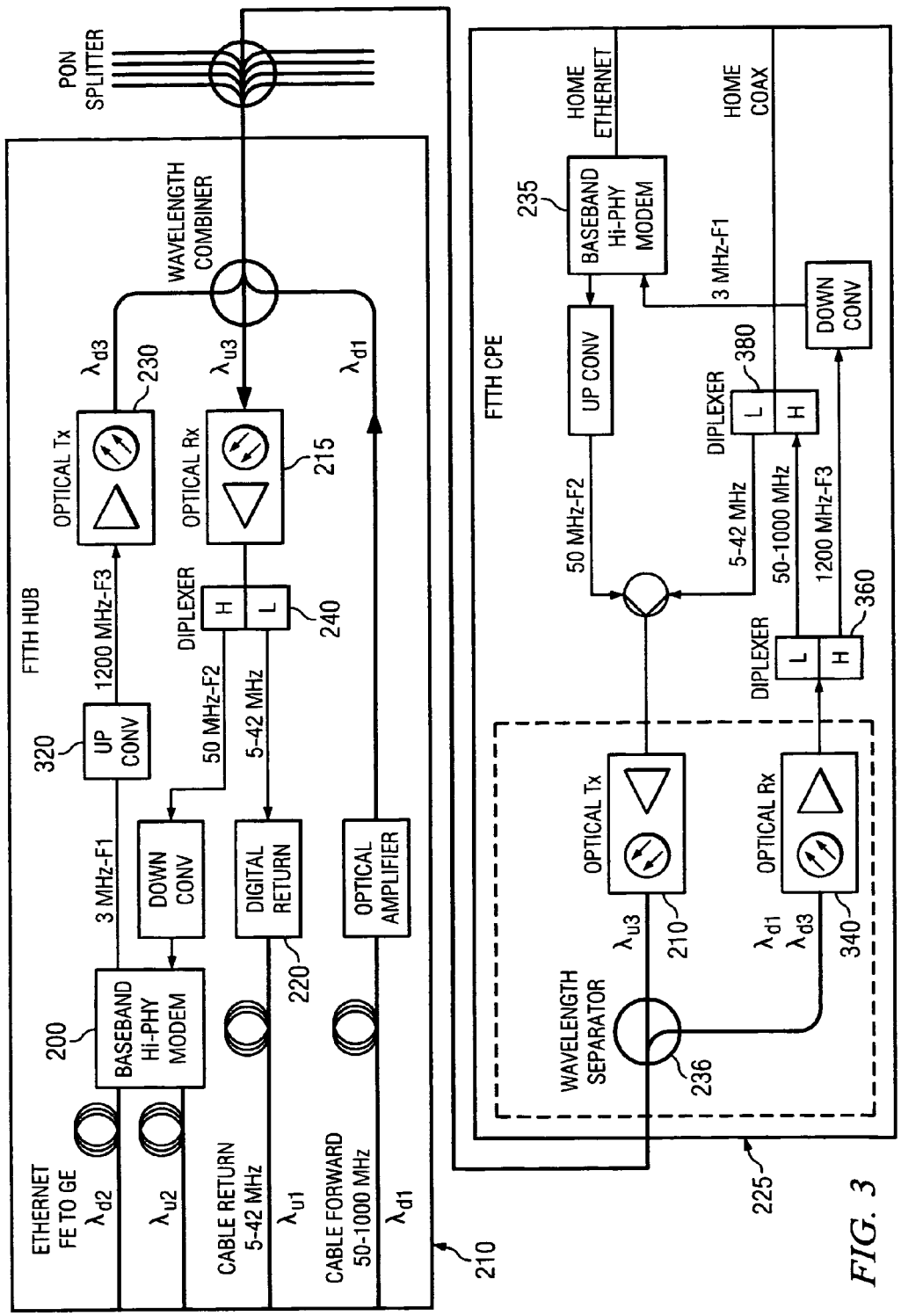
FIG. 3 depicts a lower-cost RFoG architecture where both the upstream and downstream high speed data signals are up-converted and the CPE uses a lower-cost wavelength separator and one less optical receiver.

FIG. 3 shows a variation of the previous architecture that results in lower CPE cost—a significant advantage and, therefore, a critical consideration for cable operators. The cable forward and return signals are handled as in FIG. 2. A HI PHY modem 200 is again used to transport high speed data signals. The upstream baseband signal from the HI PHY modem 235 in the CPE is again frequency up-converted into F7-F2 frequency band, combined with the traditional F9-F8 (where F9<F8<F7) cable return and the combined signal is used to modulate an upstream laser 210 as before. This is an example of frequency crossover and the generic inventive rules described before apply here as well.

The difference in this case is that the downstream HI PHY signal in the FTTH Hub 210 is also frequency up-converted, by an up-converter 320, to for instance the frequency band 1200 MHz (more generally F4 where F4<F3)-F3, where the upper frequency limit F3 again depends on the high speed data speed. This up-converted signal modulates a forward laser 230 (wavelength $\lambda_{d3}$, 1550 nm for example). At the FTTH CPE 225, a wavelength separator 236 is used to separate the single upstream wavelength from a single downstream wavelength. It is important to appreciate that in this example, this wavelength separator 236 has to separate two widely spaced wavelengths, rather than four as in a conventional RFoG architecture (FIG. 1), and is consequently significantly less expensive.

Rather than using two optical receivers in the CPE device as in FIG. 2, both downstream signals are detected by the same optical receiver 340. Since the cable forward signal which occupies the frequency band F6 (F8<F6<F5)-F5, where F5 is typically 1000 MHz lies below the bandwidth of the up-converted high speed data downstream signal (which occupies the frequency band F4-F3, where F4 could be 1200 MHz for example), an RF diplexer filter 360 can be used to separate these signals. The cable forward signal goes to a standard cable diplexer filter 380 that separates the cable upstream and downstream signals.

Significantly, although this architecture requires an additional frequency up-converter in the Hub, this cost is shared among all the CPEs fed by the Hub so the additional cost per subscriber is small. In addition, at the FTTH CPE 225, the lower-cost wavelength separator and elimination of one of the two optical receivers in the CPE directly translates into a significantly lower cost per subscriber. As in the previous architecture, anywhere from one to four fibers can be used to transport the four wavelengths present between the HE and the Hub.

Architecture with One Fewer Up-converter and Down-converter

Figure 4:
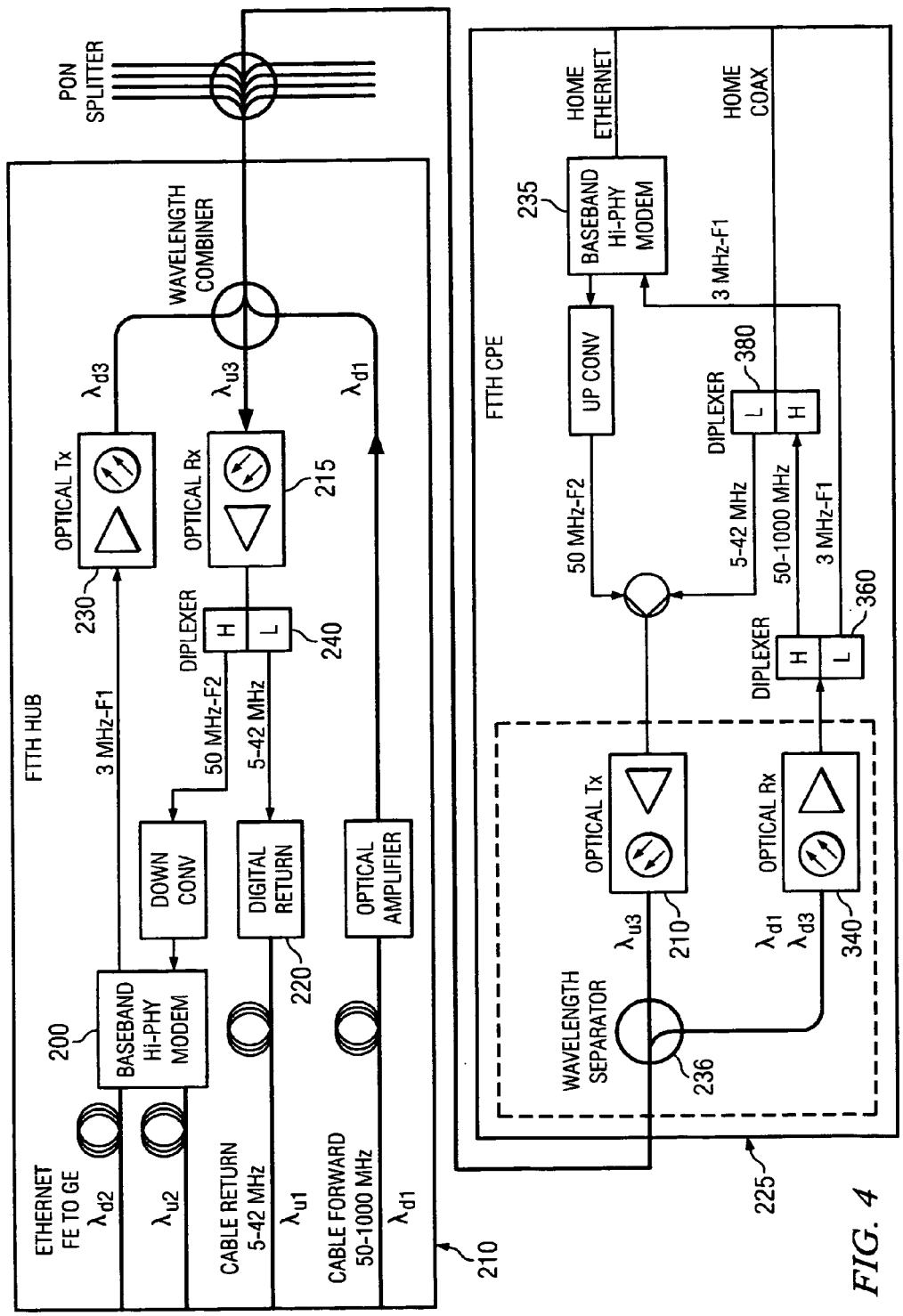
FIG. 4 depicts a yet lower-cost architecture (where the up-converter in the hub and the down-converter in the CPE unit are eliminated) that is possible if the upper frequency limit of the high speed data baseband signal F1 is lower than the lower frequency of the downstream cable signal F6.

FIG. 4 illustrates an even-lower cost architecture where the up-converter in the Hub and the down-converter in the CPE unit are both eliminated in the high speed data circuitry yet the CPE unit still uses a lower-cost wavelength separator 236 and only one optical receiver 340. This is possible if the upper frequency limit of the HI PHY modulated signal, F1, is less than the lower frequency limit of traditional downstream cable signals, denoted by F6 (where F6 typically ranges from 50 to 120 MHz). This bandwidth is still sufficient to transport several hundreds of Mb/s of data due to the high spectral efficiency of HI PHY modems.

Since the baseband HI PHY signal lies in a frequency band completely below that of the forward cable signal (which occupies the frequency band F6-F5), only one optical receiver 340 can still detect both signals in the CPE device. A diplexer 360 again separates the two downstream signals, but a down-converter is no longer needed in the CPE unit for the baseband HI PHY signal. The baseband HI PHY signal goes directly to the HI PHY modem 235 in the CPE unit. Note that this is possible when F1<F6 (F6<F5<F4<F3) where F1 is upper frequency of downstream baseband high speed data signal, F6 is lower frequency of traditional downstream cable signal (typically ranged from 50 to 120 MHz), F5 is the upper frequency of the downstream cable signal (typically 1000 MHz), F4 is the lower frequency of the up-converted downstream high speed data signal (1200 MHz for example) and F3 is the upper frequency of the up-converted downstream high speed data signal (up-converted signal is not used in the architecture but is listed here to depict downstream frequency relationship for different signals).

The upstream high speed data signal is still up-converted as in the previous architectures, but elimination of the Hub up-converter and the CPE down-converter results in a further reduction in the cost-per-subscriber of this architecture. As in the previous architectures, there can be anywhere from one to four fibers between the Headend and the Hub to transport the four wavelengths present in this link.

For the reverse path we define, F0 (lower frequency limit of the upstream HI PHY modulated signal) and F9<F8<F7<F2 where F9 is lower limit of cable reverse, F8 is upper limit of cable reverse and is lower than F6, F7 is a lower limit of up-converted upstream high speed data and can be generally equal to F6 but does not to have to, and F2 is the upper limit of up-converted upstream high speed data).

G(E)PON Architecture

Figure 5:
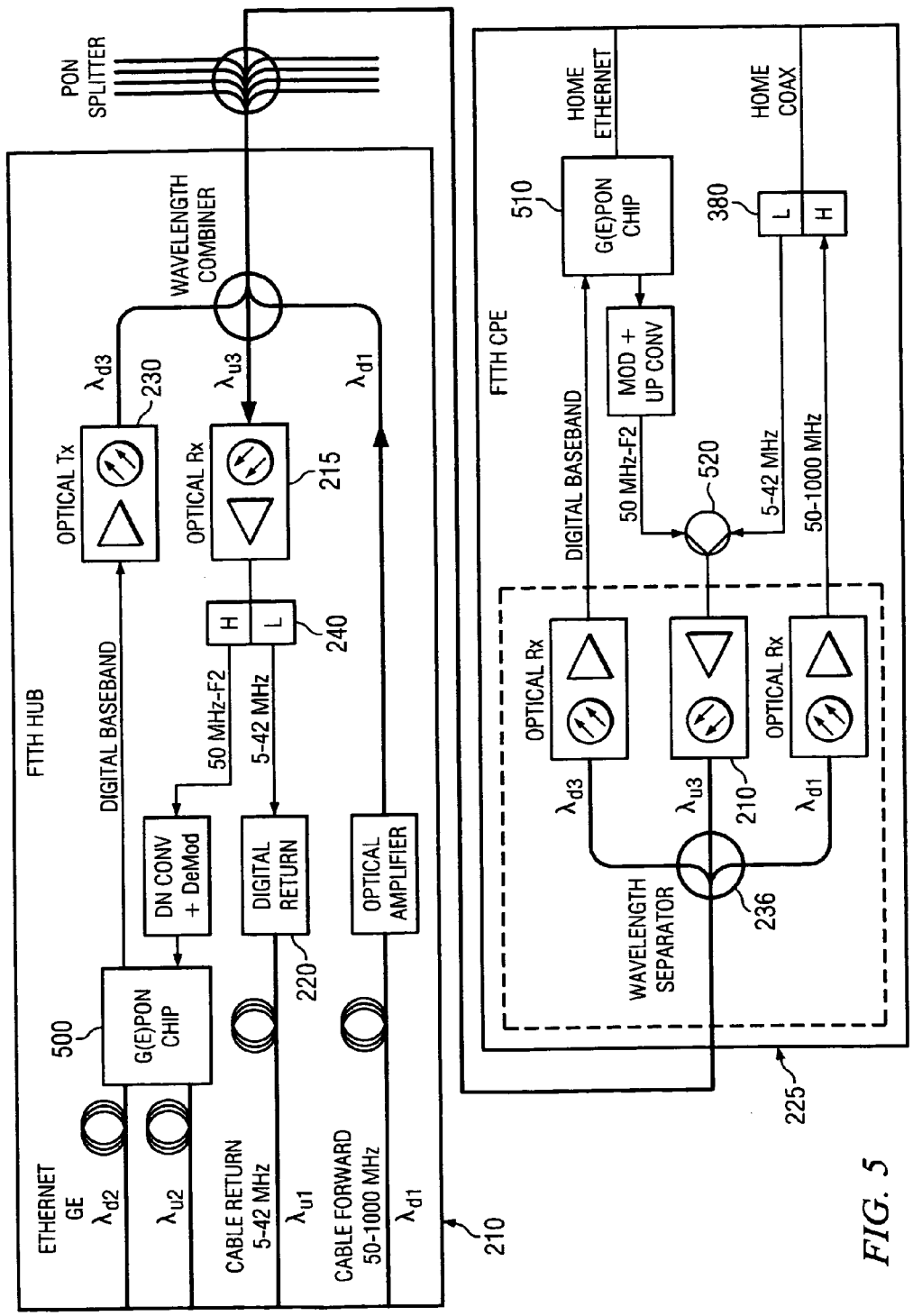
FIG. 5 depicts an architecture using low-cost PON chip sets for G(E)PON overlay with the upstream PON signal modulated by a HI PHY modem and up-converted above 50 MHz so that a single laser transports both the cable return and PON signals.

FIG. 5 shows an architecture that is similar to that shown in FIG. 2 except that it offers PON service using low-cost GPON or GEPON chip sets 500, 510. The cable forward and return signals are handled exactly as in FIG. 2. The downstream baseband signal from the PON chip 500 in the Hub 210 modulates a laser 230 (wavelength $\lambda_{d3}$, 1490 nm for example) and is distributed to the CPEs where an optical filter separates it and feeds it to an optical receiver. From there, the baseband PON signal goes to a PON chip 510 in the CPE 225 and then to the home or SMB.

The upstream baseband signal from the CPE PON chip is modulated by a HI PHY modem and then frequency up-converted to the frequency band F7-F2, where the upper frequency limit F2 depends on the modulation scheme used but is typically in the 200 MHz-300 MHz range. Since this up-converted PON signal lies in a frequency band above the cable return signal, they can be combined together using a simple RF combiner 520 and this combined signal used to drive a return laser 210 (wavelength $\lambda_{u3}$, typically 1310 nm).

At the Hub 210, the combined return signals from all the CPEs are detected and an RF diplexer 240 is used to separate the cable return from the up-converted PON return. The up-converted PON return is frequency down-converted back to baseband, demodulated by a HI PHY modem, and the resulting baseband PON signal fed to the PON chip 500. As before, the four wavelengths between the HE and the Hub can be multiplexed if desired and transported over any number of fibers, from one to four.

The advantages of this architecture example over that of the standard RFoG architecture of FIG. 1 is lower CPE cost due to the elimination of one return laser, the use of standard G(E)PON chipsets 500, 510, and the use of a lower-cost wavelength separator 236 in the CPE unit 225 (since there are only 3 wavelengths instead of four to separate).

Definitions

The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The phrase radio frequency (RF) is intended to mean frequencies less than or equal to approximately 300 GHz as well as the infrared spectrum.

The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term distal, as used herein, is intended to mean far, away, spaced apart from and/or non-coincident, and includes spatial situation where specified functions and/or results (if any) can be carried out and/or achieved. The term deploying is intended to mean designing, building, shipping, installing and/or operating. The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub)method, (sub)process and/or (sub)routine for achieving the recited result.

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition.

Unless otherwise defined, all technical and scientific terms used herein have the same meaning as commonly understood by one of ordinary skill in the art to which this invention belongs. In case of conflict, the present specification, including definitions, will control.

Conclusion

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences. The individual components of embodiments of the invention need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials. Homologous replacements may be substituted for the substances described herein. Agents which are both chemically and physiologically related may be substituted for the agents described herein where the same or similar results would be achieved.

Various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising: deploying a modified RFoG architecture and CPE device including
    optically combining and detecting cable return signals from a plurality of CPEs with a single optical receiver at an FTTH hub; and at each of the plurality of CPEs
    modulating a baseband upstream data signal by a HI PHY modem;
    up-converting the baseband upstream data signal to a frequency band above a frequency band of an upstream cable return signal;
    combining the up-converted upstream data signal with an upstream cable return signal;
    transmitting the up-converted upstream data signal and the upstream cable return signal using a single upstream laser $\lambda_{u3}$; and
    separating, with a wavelength separator, A) a downstream data signal $\lambda_{d3}$ and a downstream cable feed signal $\lambda_{d1}$ from B) the transmitted combined $\lambda_{u3}$ up-converted upstream data signal and upstream cable return signal; and
    receiving the downstream data signal and the downstream cable feed signal using a single downstream receiver;
    separating the downstream data signal from the downstream cable feed signal using an RF diplexer; and
    wherein an upper frequency limit of a downstream baseband downstream data signal, F1, is less than a lower frequency limit of a downstream cable feed, denoted by F6, wherein F1 <F6 (F6<F5<F4<F3) where F5 is an upper frequency of the downstream cable signal, F4 is the lower frequency of the up-converted downstream high speed data signal and F3 is the upper frequency of the up-converted downstream high speed data signal.

2. An apparatus, comprising: a modified RFoG architecture and CPE device including
    a single optical receiver at an FTTH hub that optically combines and detects cable return signals from a plurality of CPEs; each of the plurality of CPEs including
    a HI PHY modem that modulates a baseband upstream data signal;
    a frequency up-converter coupled to the HI PHY modem that up-converts the baseband upstream data signal to a frequency band above a frequency band of an upstream cable return signal;
    a combiner coupled to the frequency up-converter that combines the up-converted upstream data signal with an upstream cable return signal;
    a single upstream laser $\lambda_{u3}$ coupled to the combiner that transmits the up-converted upstream data signal and the upstream cable return signal; and
    a wavelength separator coupled to the single upstream laser that separates A) a downstream data signal $\lambda_{d3}$ and a downstream cable feed signal $\lambda_{d1}$ from B) the transmitted combined $\lambda_{u3}$ up-converted upstream data signal and upstream cable return signal; and
    a single optical receiver coupled to the wavelength separator that receives the downstream data signal and the downstream cable feed signal; and
    an RF diplexer coupled to the single optical receiver that separates the downstream data signal from the downstream cable feed signal; and
    wherein an upper frequency limit of a downstream baseband downstream data signal, F1, is less than a lower frequency limit of a downstream cable feed, denoted by F6, wherein F1 <F6 (F6<F5<F4<F3) where F5 is an upper frequency of the downstream cable signal, F4 is the lower frequency of the up-converted downstream high speed data signal and F3 is the upper frequency of the up-converted downstream high speed data signal.

3. A method comprising: deploying a modified RFoG architecture and CPE device including
    optically combining and detecting cable return signals from a plurality of CPEs with a single optical receiver at an FTTH hub; and at each of the plurality of CPEs
    up-converting the baseband upstream data signal to a frequency band above a frequency band of an upstream cable return signal;
    combining the up-converted upstream data signal with an upstream cable return signal;
    transmitting the up-converted upstream data signal and the upstream cable return signal using a single upstream laser $\lambda_{u3}$,
    separating, with a wavelength separator, A) a downstream data signal $\lambda_{d3}$ and a downstream cable feed signal $\lambda_{d1}$ from B) the transmitted combined $\lambda_{u3}$ up-converted upstream data signal and upstream cable return signal; and
    providing an upstream baseband signal from a G(E)PON chip before up-converting; and
    receiving the downstream data signal and the downstream cable feed signal using a single downstream receiver;
    separating the downstream data signal from the downstream cable feed signal using an RF diplexer; and
    wherein an upper frequency limit of a downstream baseband downstream data signal, F1, is less than a lower frequency limit of a downstream cable feed, denoted by F6, wherein F1 <F6 (F6<F5<F4<F3) where F5 is an upper frequency of the downstream cable signal, F4 is the lower frequency of the up-converted downstream high speed data signal and F3 is the upper frequency of the up-converted downstream high speed data signal.

4. An apparatus, comprising: a modified RFoG architecture and CPE device including
    a single optical receiver at an FTTH hub that optically combines and detects cable return signals from a plurality of CPEs, each of the plurality of CPEs including
    a frequency up-converter that up-converts the baseband upstream data signal to a frequency band above a frequency band of an upstream cable return signal;
    a combiner coupled to the frequency up-converter that combines the up-converted upstream data signal with an upstream cable return signal;
    a single upstream laser $\lambda_{u3}$ coupled to the combiner that transmits the up-converted upstream data signal and the upstream cable return signal and
    a wavelength separator coupled to the single upstream laser that separates A) a downstream data signal $\lambda_{d3}$ and a downstream cable feed signal $\lambda_{d1}$ from B) the transmitted combined $\lambda_{u3}$ up-converted upstream data signal and upstream cable return signal; and a G(E)PON chip coupled to the frequency up-converter; and a single optical receiver coupled to the wavelength separator that receives the downstream data signal and the downstream cable feed signal; and an RF diplexer coupled to the single optical receiver that separates the downstream data signal from the downstream cable feed signal; and wherein an upper frequency limit of a downstream baseband downstream data signal, F1, is less than a lower frequency limit of a downstream cable feed, denoted by F6, wherein F1 <F6 (F6<F5<F4<F3) where F5 is an upper frequency of the downstream cable signal, F4 is the lower frequency of the up-converted downstream high speed data signal and F3 is the upper frequency of the up-converted downstream high speed data signal.

* * * * *